United States Patent [19]

Mauget et al.

[11] Patent Number: 5,392,324
[45] Date of Patent: Feb. 21, 1995

[54] DEVICE FOR AND METHOD OF REMOVING THE RESIDUAL POWER FROM A FAST-NEUTRON NUCLEAR REACTOR AT SHUTDOWN

[75] Inventors: Christian Mauget, Marcy l'Etoile; Benoit Giraud, Lyons, both of France

[73] Assignee: Framatome, Courbevoie, France

[21] Appl. No.: 84,313

[22] Filed: Jul. 1, 1993

[30] Foreign Application Priority Data

Jul. 1, 1992 [FR] France ................. 92 08113

[51] Int. Cl.⁶ .............................................. G21C 15/18
[52] U.S. Cl. ..................................... 376/299; 376/290; 376/405
[58] Field of Search ............. 376/289, 290, 291, 298, 376/299, 405; 165/104.34

[56] References Cited

U.S. PATENT DOCUMENTS

| | | | |
|---|---|---|---|
| 4,148,686 | 4/1979 | Pouderoux | 376/298 |
| 4,678,626 | 7/1987 | Germer | 376/299 |
| 4,698,201 | 10/1987 | Masse | 376/405 |
| 5,043,135 | 8/1991 | Hunsbedt et al. | 376/299 |
| 5,158,741 | 10/1992 | Boardman et al. | 376/299 |
| 5,215,708 | 6/1993 | Fennern et al. | 376/299 |

FOREIGN PATENT DOCUMENTS

| | | |
|---|---|---|
| 0108690 | 5/1984 | European Pat. Off. |
| 0153225 | 8/1985 | European Pat. Off. |
| 2335916 | 7/1977 | France |
| 2374609 | 7/1978 | France |
| 2488382 | 2/1982 | France |

*Primary Examiner*—Daniel D. Wasil
*Attorney, Agent, or Firm*—Pollock, Vande Sande & Priddy

[57] ABSTRACT

The nuclear reactor includes a fuel core (5) inside a vessel (2) and a system (1) for cooling the core (5), in which a liquid metal circulates and on which is placed at least one steam generator (15). The steam generator includes a casing (15a) in which the liquid metal circulates, water-feed means (16) and means for heat exchange between the liquid metal and the feed water. The liquid metal is caused to circulate in the cooling system (1), the steam generator (15) not being fed with water and the liquid metal circulating in the steam generator (15) is cooled by the flow of a gas in contact with the casing (15a) of the steam generator (15). The cooling device includes a tubular element (25) placed around the casing (15a) of the steam generator and defining an annular space for a cooling gas to flow around the casing (15a).

2 Claims, 4 Drawing Sheets

DEVICE FOR AND METHOD OF REMOVING THE RESIDUAL POWER FROM A FAST-NEUTRON NUCLEAR REACTOR AT SHUTDOWN

FIELD OF THE INVENTION

The invention relates to a device for and a method of removing the residual energy from a fast-neutron nuclear reactor at shutdown.

BACKGROUND OF THE INVENTION

Fast-neutron nuclear reactors include a core constituted by fuel assemblies, in which core heat is released due to the effect of the nuclear reactions.

The fuel core, which is placed inside a large-sized vessel, is cooled by a heat-transfer fluid which is generally constituted by liquid metal.

In addition, the nuclear reactor includes at least one cooling system in which the heat released by the core and taken up by the heat-transfer liquid metal enables the feed water to be heated up and vaporised inside steam generators.

In general, the heat released by the core is transmitted to the feed water via a primary coolant constituted by a first liquid metal, which may be liquid sodium, circulating inside the reactor vessel, and via a second liquid metal which may also be constituted by sodium and which circulates in the secondary cooling system of the nuclear reactor on which the steam generators are placed.

In the case of integrated-type fast-neutron nuclear reactors, the nuclear-reactor vessel is filled with liquid metal such as sodium in which the reactor core is submerged. Intermediate heat exchangers are also submerged in the liquid metal filling the vessel and each include a heat-exchange element connected to the secondary cooling system of the steam generator and in which the secondary heat-exchange fluid circulates.

The liquid metal filling the vessel and constituting the primary coolant cools the core and yields up the heat taken up from the core assemblies to the secondary coolant circulating in the intermediate heat exchangers.

Inside the steam generators, the secondary coolant heats up and vaporizes the feed water and cools down.

When it is desired to operate the reactor under accident conditions or to shut it down, for example prior to maintenance, repair and/or core-reloading operations, control rods made of neutron-absorbing material are inserted inside some of the core assemblies, constituting the assemblies for controlling the nuclear reaction.

The control rods, in the maximum insertion position inside the core, make it possible for the most part to stop the nuclear reactions occurring in the core and releasing energy.

However, because the materials constituting the core are activated, after a period of operation of the nuclear reactor, the nuclear reactor possesses residual energy which is transmitted to the coolant in the form of heat.

It is necessary to remove this residual energy in the form of heat in order to cool the nuclear reactor completely, prior to carrying out work inside the vessel.

It is known to use heat exchangers designed especially to remove the residual heat of the nuclear reactor at shutdown.

In the case of integrated-type fast-neutron nuclear reactors, these heat exchangers may be submerged in the nuclear-reactor vessel, like the intermediate heat exchangers, so as to cool the primary coolant directly.

Such devices are complex and expensive to produce and require additional coolant-feed systems.

SUMMARY OF THE INVENTION

It is an object of the invention to provide a device for removing the residual power from a fast-neutron nuclear reactor at shutdown and/or under accident conditions, the nuclear reactor including a vessel containing the reactor fuel core and a system for cooling the core, in which a liquid metal circulates and on which is placed at least one steam generator including a substantially cylindrical casing having a vertical axis in which casing the liquid metal circulates, water-feed means and means for heat exchange between the liquid metal and the feed water, including, around the body of the steam generator, a tubular unit for recovering heat and for guiding a cooling gas and means for causing the cooling gas to flow in an annular space between the tubular unit and the casing of the steam generator, this device enabling the residual power of the reactor to be removed without requiring expensive additional plant.

To this end, the tubular unit includes a metal shell covered on the outside by a layer of thermally insulating material and carrying, on its internal surface, a plurality of fins placed longitudinally of the shell.

The invention also relates to a method of removing the residual power from a fast-neutron reactor.

BRIEF DESCRIPTION OF THE INVENTION

In order that the invention may be well understood, there will now be described, by way of non-limiting example, and with reference to the attached drawings, a secondary cooling system for a fast-neutron steam generator and a device for removing residual power according to the invention.

DESCRIPTION OF A PREFERRED EMBODIMENT

Figure 1:
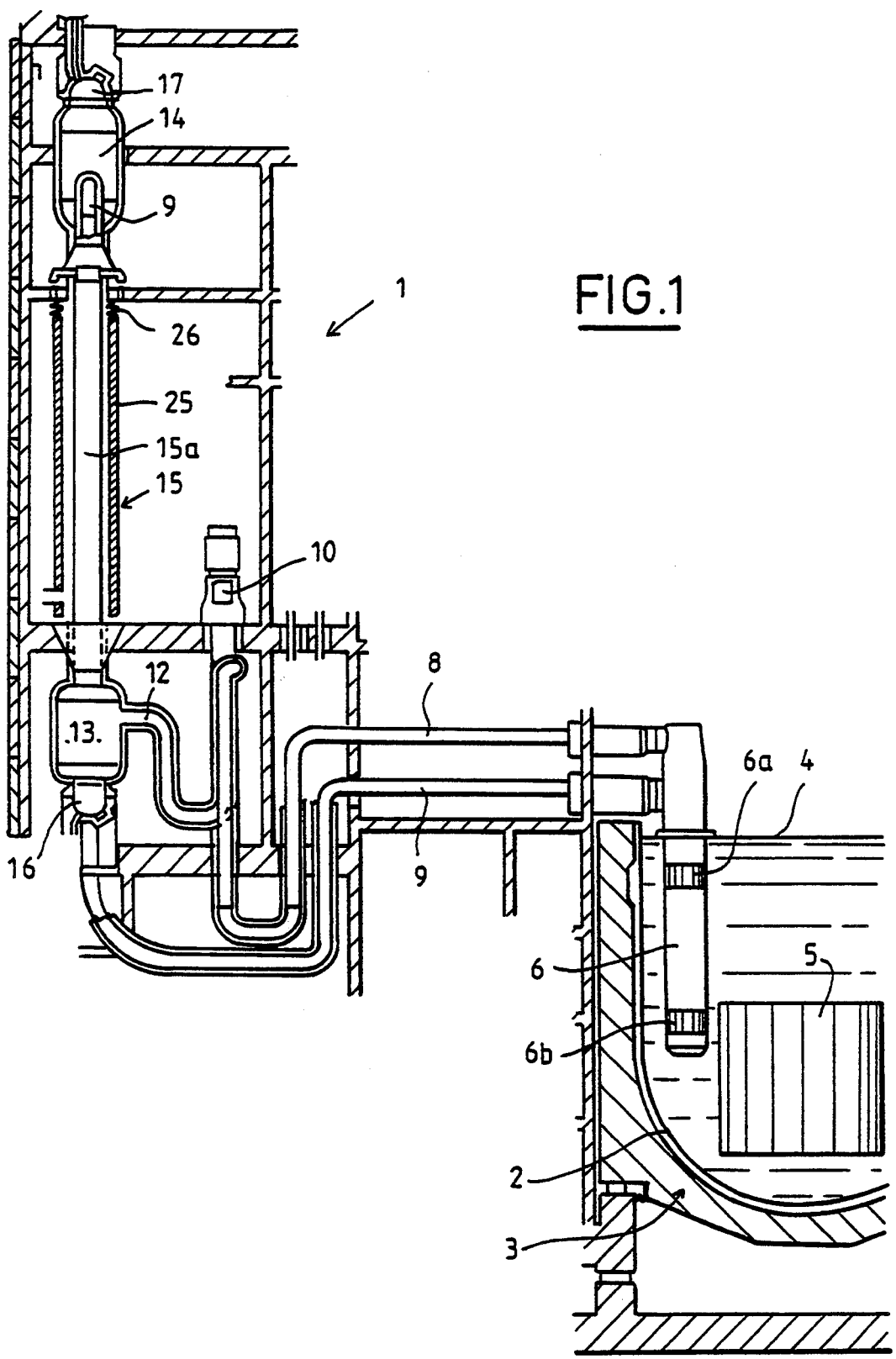
FIG. 1 is a view, in elevation and in cross-section, of a part of a secondary cooling system for an integrated-type fast-neutron nuclear reactor.

FIG. 1 shows a part of the secondary cooling system 1 of an integrated-type fast-neutron nuclear reactor.

The nuclear reactor includes a vessel 2 fixed to the concrete structure 3 of the nuclear reactor and containing primary-coolant liquid sodium up to a level 4.

The reactor core 5 constituted by Juxtaposed fuel assemblies is submerged inside the liquid sodium filling the vessel 2.

Intermediate heat exchangers 6 pass through the slab for closing the upper part (not shown) of the vessel 2 and are submerged over a part of their height in the liquid sodium filling the vessel.

In the nuclear-reactor vessel 2 or primary vessel are placed structures constituting the internal vessel making it possible to channel the circulation of the primary liquid sodium cooling the core 5.

The intermediate heat exchangers 6 are placed, in relation to the internal vessel, so that the high-temperature primary sodium leaving the core penetrates into the intermediate heat exchanger via an upper port 6a and emerges from the intermediate heat exchanger 6 at a lower temperature, via a lower port 6b. The cooled sodium leaving the intermediate heat exchangers is circulated by pumps which enable it to be discharged to the lower part of the core 5.

The intermediate heat exchangers include a heat-exchange bundle which is connected, for feeding it with secondary sodium, to a feed pipe 8 of the secondary cooling system 1.

The secondary sodium circulates in the heat-exchange bundle of the intermediate heat exchanger 6, cools the primary sodium circulating inside the intermediate heat exchanger and is heated by thermal contact with the primary sodium, before emerging from the intermediate heat exchanger 6 via the pipe 9 of the secondary cooling system.

The feed pipe 8 is connected to the discharge part of a secondary pump 10, the intake part of which is connected via a pipe 12 to the widened lower part 13 of the casing 15a of the steam generator 15.

The outlet pipe 9 of the secondary cooling system is connected to the casing 15a of the steam generator at the widened upper part 14 of this casing.

Beneath the widened lower part 13, the steam generator includes a water box 16 and, above the widened upper part 14, a steam manifold 17.

The circulation of the secondary coolant, constituted by liquid sodium, inside the steam generator, is regulated so that the upper level of the sodium in the casing of the steam generator 15 lies in a substantially fixed position inside the widened upper part 14 during the operation of the secondary cooling system.

The structure of the steam generator 15 will now be described in more detail with reference to FIG. 2.

The steam generator 15, which is a generator of the type having straight tubes, includes a bundle 20 of long-length rectilinear tubes placed parallel to a direction which corresponds to the longitudinal direction of the bundle 20 and of the steam generator 15.

The tubes of the bundle are welded, at one of their ends, to the tube plate of the water box 16 and, at their other end, to the tube plate of the steam manifold 17.

Figure 2:
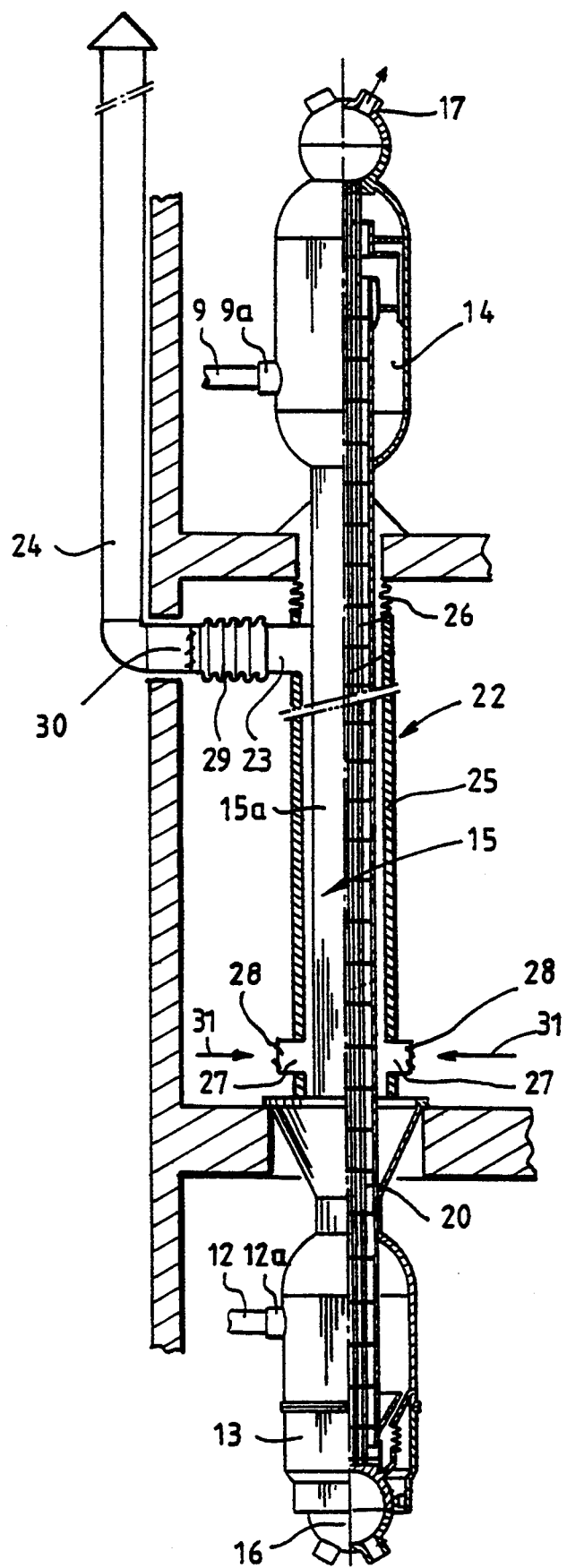
FIG. 2 is a view, in elevation with partial cross-section, of a steam generator of the secondary cooling system represented in FIG. 1.

In operation, the steam generator, as represented in FIGS. 1 and 2, is placed vertically in the structure of the nuclear reactor, i.e. in such a way that the longitudinal direction of the bundle 20 and of the steam generator 15 is vertical.

The casing 15a of the steam generator, in its central part between the widened parts 13 and 14, has the shape of a cylindrical tubular casing containing the central part of the bundle 20.

The secondary liquid sodium is heated in an intermediate heat exchanger by thermal contact with the primary liquid sodium, then transported via the pipe 9 and injected into the widened upper part 14 of the casing of the steam generator at a nozzle 9a.

The secondary liquid sodium flows in the vertical direction from the top down inside the casing of the steam generator, and emerges from this casing via a nozzle 12a connected to the pipe 12 on which the circulation pump 10 is placed.

Inside the casing of the steam generator 15, the liquid sodium circulates in contact with the outer surface of the tubes of the bundle 20 which are each connected, at one of their ends, to the water box 16 and, at their other end, to the steam manifold 17.

When the nuclear reactor is operating, feed water is injected into the water box 16, which distributes the water into the tubes of the bundle 20. The water flows from the bottom up in the tubes of the bundle, is heated inside the tubes by thermal contact with the secondary liquid sodium, and is then vaporized and recovered in the form of steam in the upper manifold 17.

According to the method of the invention, the nuclear reactor steam generators, such as the steam generator 15, may be used to remove the residual energy from the nuclear reactor, in the form of heat, after a shutdown by inserting the absorbing rods in the maximum insertion position into the assemblies for controlling the core.

In order to cool the reactor by the method of the invention, either at shutdown or under accident operating conditions, each of the steam generators, such as the steam generator 15, is associated with a cooling device 22, such as represented in FIG. 2.

The cooling device 22 includes a unit 25 of tubular shape which is placed around central part of the casing 15a of the steam generator 15, a chimney 24 and a pipe 23 linking the tubular unit of the device 22 to the chimney 24.

The upper part of tubular unit 25 is fixed to the reactor structure supporting the steam generator 15 by means of a bellows joint 26 fixed beneath an opening for the casing 15a of the steam generator 15 to pass through.

At its other end (not shown in FIG. 2), the tubular unit 25 is connected in a sealed manner to the casing 15a of the steam generator 15.

The lower part of tubular unit 25 includes air inlet openings 27 at which air passage ports 28, equipped with dampers for regulating the air flow rate, are fixed.

A bellows joint 29 is interposed on the pipe 23 joining the tubular part 25 of the cooling device 22 to the chimney 24. A damper unit 30 makes it possible to regulate the air flow rate in the pipe 23, upstream of the chimney 24.

The bellows, such as 26 and 29, make it possible to absorb differential deformations due to thermal expansion between the elements of the cooling device 22 and the nuclear reactor support structure.

The chimney 24, the height of which may be considerable (for example twenty five meters in the case of a steam generator of a fast-neutron nuclear reactor of the currently constructed type) makes it possible to create an air inrush and a flow of air from the bottom up, inside the tubular unit 25 of the device 22, via the pipe 23.

The air penetrates the lower part of the tubular unit 25 via the ports 28 and flows from the bottom up in the annular space between the uit 25 of the device 22 and the casing 15a of the steam generator.

The flow rate of air entering the tubular unit 25 (in the direction of arrow 31) may be regulated by the dampers equipping the ports 28.

Likewise, the air flow rate may be regulated at the outlet of the tubular unit 25 and at the inlet of the chimney 24 by the dampers 30.

The flow of cooling air from the bottom up in the annular space between the tubular unit 25 and the external surface of the casing 15a of the steam generator 15 may be provided solely by draught and by natural convection or may be established, under forced conditions, by using a fan.

Figure 3:
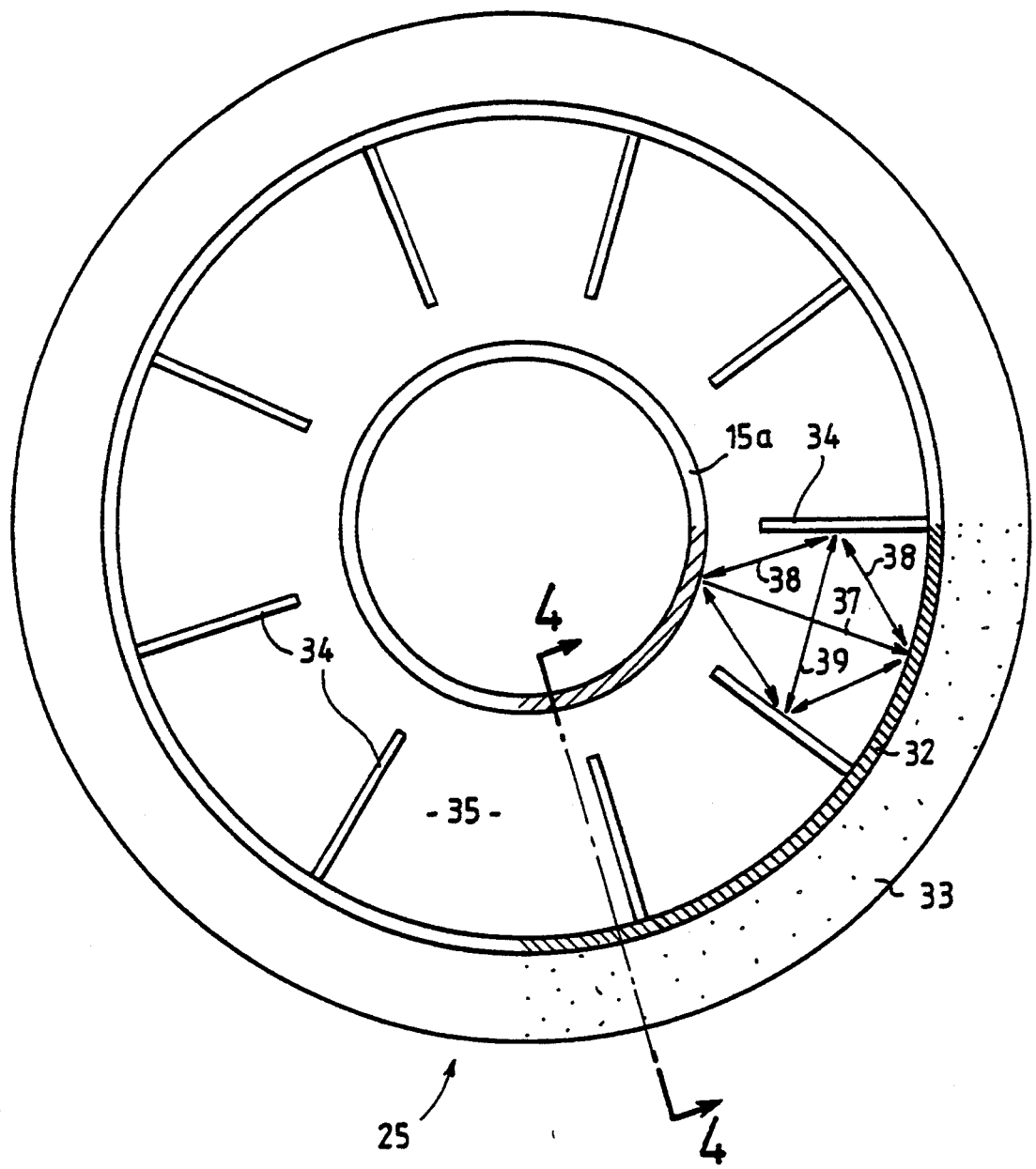
FIG. 3 is a view, in transverse cross-section, of the casing of the steam generator and of a device for cooling this casing by means of gas.
Figure 4:
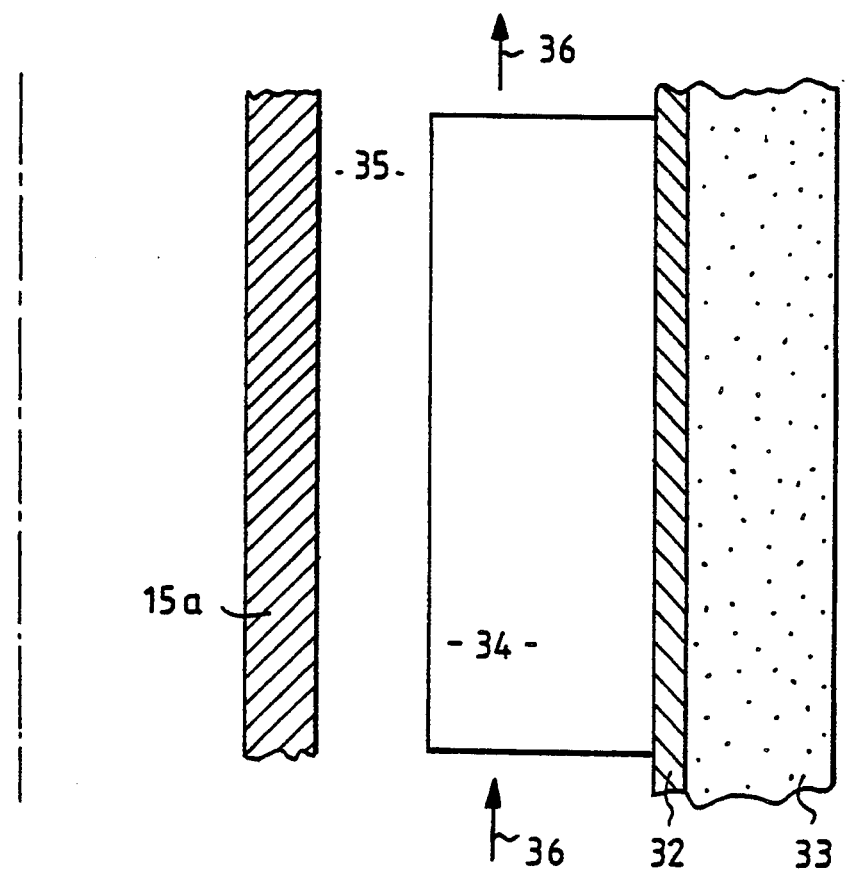
FIG. 4 is a view in longitudinal cross-section along line 4—4 of FIG. 3.

Reference will now be made to FIGS. 3 and 4 in order to describe in more detail the structure of the tubular unit 25 surrounding the casing 15a of the steam generator 15.

The tubular unit 25 includes a metal shell 32 placed coaxially with the casing 15a of the steam generator and connected at its upper part to the reactor structure via the bellows 26.

The shell 32 is covered by a sleeve 33 made of thermally insulating material which thermally insulates the outer surface of the shell 32 from the outside environment.

On the inner surface of the shell 32 are fixed, for example by welding, fins 34 constituted by plane portions of metal sheet, for the purpose of increasing the surface area for heat exchange by radiation.

The fins 34 are fixed to the shell 32, in the longitudinal direction, along generatrices of this shell. Successive sets of fins, uniformly spaced along the internal periphery of the shell 32, as represented in FIG. 3, are placed along the length of the shell 32.

Reference will now be made to all the figures in order to describe the implementation of the method for removing residual energy according to the invention, by removal of heat via the secondary cooling system, during a reactor shutdown.

The reactor is shut down by inserting elements creating very strong negative reactivity in the reactor core 5.

In order to remove the residual power from the nuclear reactor after shutting it down, the secondary liquid sodium continues to be circulated in the secondary cooling system 1 by the secondary pumps such as the pump 10. The secondary sodium thus circulates inside the intermediate heat exchanger 6 and cools the primary sodium which recovers the residual energy from the reactor, as manifested by a release of heat inside the core.

The secondary sodium recovered at the outlet of the intermediate heat exchanger 6 via the pipe 9 is sent into the upper part of the steam generator 15.

The secondary sodium then circulates inside the casing of the steam generator 15 and emerges at the lower part of the casing, via the pipe 12.

During the cooling of the reactor at shut-down, the water feed of the water box 16 of the steam generator 15 is interrupted and the dampers of the ports 28 and of the pipe 23 are opened so that cooling air flows, from the bottom up, in the annular space 35 between the shell 32 and the casing 15a of the steam generator.

The heat of the secondary liquid sodium circulating in the casing 15a of the steam generator is transmitted through the wall of the casing 15a by conduction and then from the outer surface of the casing 15a by radiation, so that the heat flux flows between the casing 15a of the steam generator and the shell 32, either directly (arrows 37) or via the fins 34 (arrows 38). The heat flux also flows between the fins 34 (arrows 39).

The fins 34 channel the cooling air flowing in the annular space 35 and removing the heat transmitted by the casing 15a of the steam generator and coming from the secondary sodium.

The cooling device 22, in particular because of its structure represented in FIGS. 3 and 4, makes it possible to remove efficiently the heat transported by the secondary sodium inside the casing of the steam generator.

It is therefore possible to take up the residual heat from the nuclear reactor very efficiently, it being possible for the air flow rate in the device 22 and the thermal power of this cooling device 22 to be very high.

Furthermore, the cooling device 22 may operate without energy from outside, the cooling air flowing by natural convection inside the annular space 35.

If operation under forced-convection conditions is envisaged, an additional fan can be provided, but this is not necessary in most cases.

The method and the device according to the invention therefore make it possible, very simply and very efficiently, to cool the nuclear reactor at shutdown and to remove its residual energy.

The invention only implements devices and cooling systems existing in the nuclear reactor, or very simple additional devices such as the cooling device 22. Furthermore, the structure of the steam generator is not modified, the cooling device being fixed to the support structure of the steam generator and including no element fixed to the steam generator itself.

It is possible to use a cooling device other than the one which has been described and to use a heat-exchange gas other than atmospheric air.

Finally, the device and the method according to the invention may be used to remove residual energy from a nuclear reactor which includes steam generators of a type other than the straight-tube type.

We claim:

1. In a fast-neutron nuclear reactor comprising a vessel containing a reactor fuel core and a system for cooling said core in which a liquid metal circulates and on which is placed at least one steam generator including a substantially cylindrical casing having a vertical axis, in which the liquid metal circulates, water-feed means and means for heat exchange between the liquid metal and the feed water, a device for removing residual power from said reactor at shutdown and/or under accident conditions, including, around said casing of said at least one steam generator, a tubular unit for recovering heat and for guiding a cooling gas including a metal shell covered on the outside by a layer of thermally insulating material and carrying, on its internal surface, a plurality of fins placed longitudinally of the shell and means for causing the cooling gas to flow in an annular space between said tubular unit and said casing of said at least one steam generator constituted by a vertical chimney connected to an upper part of said annular space via a pipe and at least one air inlet port in said annular space, at a lower part of said tubular unit, wherein said tubular unit is connected to a support structure of the steam generator by means of a bellows.

2. Device according to claim 1, wherein an expansion bellows is interposed on the pipe linking said tubular unit to said chimney.

* * * * *